United States Patent
Urban

(10) Patent No.: US 9,306,678 B2
(45) Date of Patent: Apr. 5, 2016

(54) DATA INTERPRETATION WITH NOISE SIGNAL ANALYSIS

(71) Applicant: Comcast Cable Communications, LLC, Philadelphia, PA (US)

(72) Inventor: David Urban, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/260,981

(22) Filed: Apr. 24, 2014

(65) Prior Publication Data

US 2015/0311984 A1    Oct. 29, 2015

(51) Int. Cl.
*H04B 15/00* (2006.01)
*H04B 1/62* (2006.01)
*H04L 25/02* (2006.01)

(52) U.S. Cl.
CPC .................. *H04B 15/00* (2013.01); *H04B 1/62* (2013.01); *H04L 25/022* (2013.01)

(58) Field of Classification Search
CPC ........ H04B 1/1027; H04B 1/10; H04B 15/00; H04B 1/62; H04B 25/022
See application file for complete search history.

(56) References Cited

U.S. PATENT DOCUMENTS

| | | | | |
|---|---|---|---|---|
| 4,462,081 | A * | 7/1984 | Lehan | 702/181 |
| 2005/0157822 | A1* | 7/2005 | Khandekar et al. | 375/340 |
| 2005/0176436 | A1* | 8/2005 | Mantravadi et al. | 455/450 |
| 2005/0186910 | A1* | 8/2005 | Moorti et al. | 455/65 |
| 2008/0123760 | A1* | 5/2008 | Oh et al. | 375/260 |
| 2010/0067629 | A1* | 3/2010 | Gaddam et al. | 375/346 |
| 2011/0064172 | A1* | 3/2011 | Olson et al. | 375/346 |
| 2013/0114659 | A1* | 5/2013 | Murakami et al. | 375/224 |
| 2014/0142878 | A1* | 5/2014 | Briancon et al. | 702/64 |

OTHER PUBLICATIONS

Athanasios Papoulis, "Probability, Random Variables, and Stochastic Processes", McGraw-Hill, 1984, pp. 12, equation (1-8).
Data Over Cable Service Interface Specifications, DOCSIS3.0, ; Physical Layer Specification, CM-SP-PHYv3.0-I08-090121, ; Cable Labs, Jan. 21, 2009 (169 pages).
Digital Video Broadcasting (DVB); Frame structure channel coding and modulation for a second generation digital transmission system for cable systems (DVB-C2), Draft ETSI EN 302 769 V1.2.1, 2010 (111 pages).
MacKay, D.J., Neal, R. M.: Near Shannon limit performance of low ; density parity check codes, Electronics Lett., Mar. 1997, vol. 33, No. 6, pp. 457-458.
Proakis J.G., Digital Communications, 2nd ed, McGraw-Hill, ISBN: 0-07-050937-9, 1989.

(Continued)

*Primary Examiner* — Jean B Corrielus
(74) *Attorney, Agent, or Firm* — Ballard Spahr LLP

(57) ABSTRACT

Methods and systems for providing and processing data are disclosed. An example method can comprise determining a first weighted probability based on a probability of occurrence of a noise signal and a first likelihood ratio. The first likelihood ratio is based on a frequency distribution of the noise signal. An example method can comprise determining a second weighted probability based on a probability of non-occurrence of the noise signal and a second likelihood ratio. An example method can comprise determining a combination of the first weighted probability and the second weighted probability, and providing the combination to a decoder configured to decode a value based on the combination.

20 Claims, 6 Drawing Sheets

(56) References Cited

OTHER PUBLICATIONS

Prodan, R., Shen, B.Z., and Lee, T. "Downstream FEC Proposal for IEEE 802.3 EPOC—Codes, Performance, and Complexity," Mar. 11, 2013 (44 pages).

R. Gallager, "Low density parity-check codes," IRE Transactions on Information Theory, Jan. 1962 (90 pages).

R.M. Tanner, "A Recursive Approach to Low Complexity Codes," IEEE Transactions on Information Theory, vol. IT-27, No. 5, Sep. 1981 (15 pages).

T.J. Richardson, R. Urbanke, D. Forney, S.Y. Chung, "On the Design of Low-Density Parity-Check Codes within 0.0045 dB of the Shannon Limit", IEEE Communications Letters, vol. 5, No. 2, Feb. 2001 (3 pages).

Tom Richardson, Rudiger Urbanke, "Modern Coding Theory", Cambridge University Press, 2009.

Tuan Ta, "A Tutorial on Low Density Parity-Check Codes", The University of Texas at Austin (2007) (15 pages).

\* cited by examiner

DATA INTERPRETATION WITH NOISE SIGNAL ANALYSIS

BACKGROUND

Data signals provided over a physical network are subject to a variety of transmission problems. These transmission problems can distort the original data signal before the data signal is interpreted at a receiving device. These distortions result in the loss of data. Thus, there is a need for more sophisticated methods and systems for interpreting data signals on a network link to minimize data loss.

SUMMARY

It is to be understood that both the following general description and the following detailed description are exemplary and explanatory only and are not restrictive, as claimed. Methods and systems for processing data are disclosed. An example method can comprise determining a probability of occurrence of a noise signal on a network link during transmission of data. A first probability that the data represents a value can be determined. The first probability can be based on a presumption of occurrence of the noise signal during transmission of the data. A second probability that the data represents the value can be determined. The second probability can be based on a presumption of non-occurrence of the noise signal during transmission of the data. A third probability that the data represents the value can be determined. The third probability can be based on at least one of the first probability weighted by the probability of occurrence of the noise signal and the second probability weighted by a probability of non-occurrence of the noise signal. In one aspect, the data can be decoded based on the third probability.

In another aspect, an example method can comprise determining a first weighted probability based on a probability of occurrence of a noise signal and based on a first likelihood ratio. The first likelihood ratio can be based on a frequency distribution of the noise signal. A second weighted probability can be determined based on a probability of non-occurrence of the noise signal and a second likelihood ratio. A combination (e.g., summation, product, division, exponential operation or other combination) of the first weighted probability and the second weighted probability can be determined. The combination can be provided to a decoder configured to decode a value (e.g., bit value) based on the combination.

In yet another aspect, an example method can comprise receiving a first probability that data comprises a value (e.g., bit value) and determining the value based on the first probability. The first probability can be based on a function with input values, such as a second probability and a third probability. The function can be a summation, average, division, multiplication, logarithm and/or other function. For example, the first probability can be based on a weighted summation of a second probability and a third probability. The second probability can comprise a probability that the data comprises the value. The second probability can be weighted in the summation based on a probability of occurrence of a noise signal. The third probability can comprise a probability that the data comprises the value. The third probability can be weighted in the summation based on a probability of non-occurrence of the noise signal.

By way of explanation, the present methods and systems can be implemented by a network device receiving a data transmission. Certain noise signals, such as impulse noise signals, can be introduced in to a data transmission (e.g., on a hybrid fiber-coax transmission link) at various locations along the data transmission path. For example, the data transmission can comprise an upstream transmission from a user to service provider (e.g., cable network provider, internet service provider). The noise signal can be generated by one or more electronic devices, motors, switches, and/or the like at the user location, in the distribution and/or access network of the service provider, and/or the like. The present methods and systems can be used to filter out the noise signal and/or otherwise interpret the data transmission in the presence of the noise signal.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
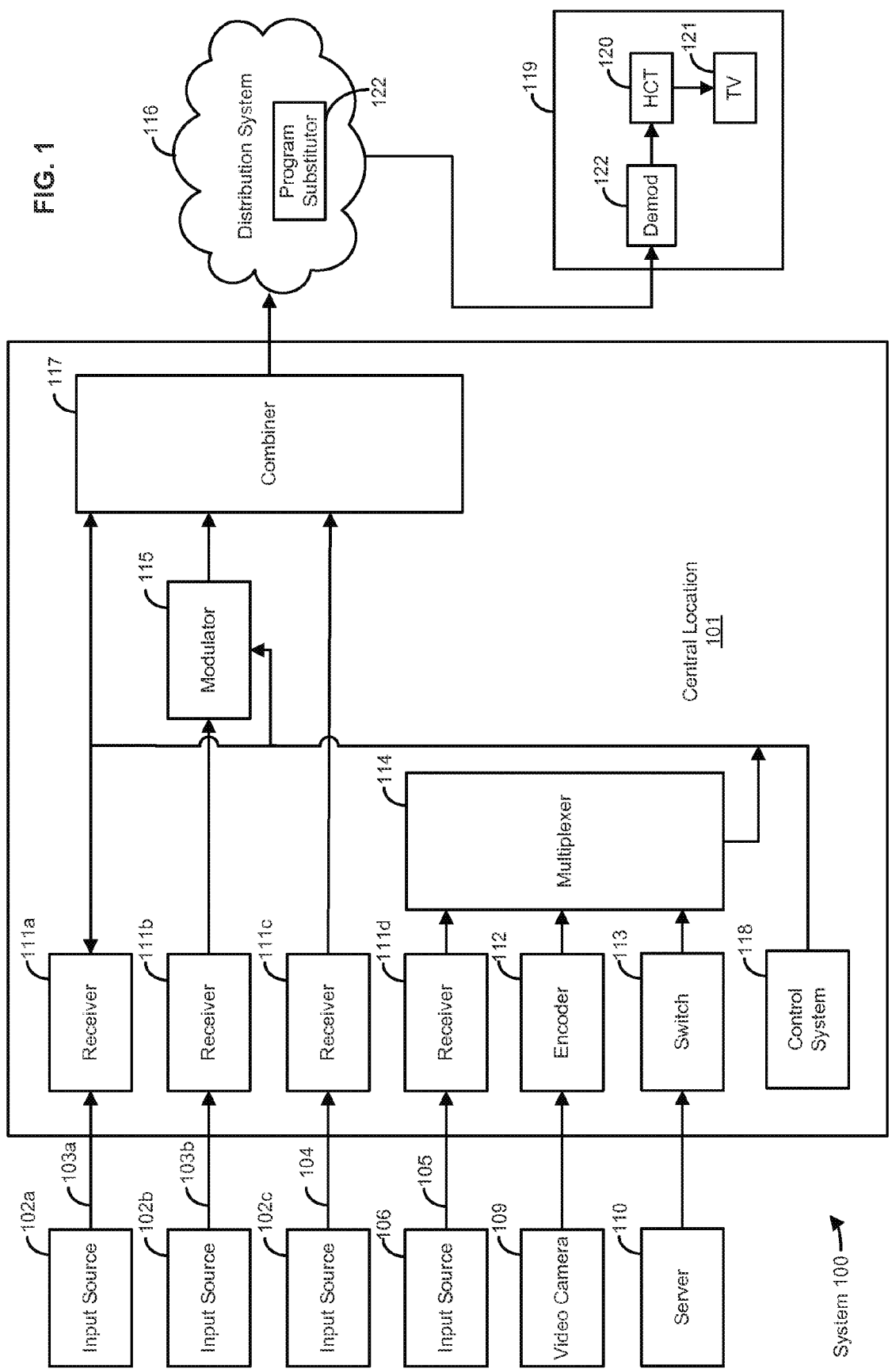
FIG. 1 is a block diagram illustrating an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to." and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In one aspect, the present methods and systems are related to the transferring and interpretation of data across a network. More specifically, the present methods and systems are related to modulation, demodulation, encoding, decoding, and/or other aspects related to transmitting data in the presence of a noise signal, distortion, and/or other interference on a network. For example, data can be provided across a network as a data signal to a device. The device can be configured to interpret a value that the data signal represents. For example, the device can interpret the value based on soft-decoding techniques, such as low density parity check based decoding. In one aspect, the device can comprise a demodulator configured to determine a probability (e.g., log-likelihood ratio) that a portion of a distorted signal is intended to represent a particular data value. The probability can be based on a probability of whether a noise signal occurred during transmission of the data. For example, the probability can be based on a summation of a first probability and a second probability. The first probability can be determined based on an assumption that the noise signal occurred during transmission of the data. The second probability can be determined based on the assumption that the noise signal did not occur during transmission of the data. The first probability can be weighted in the summation by a probability that the noise signal occurred during transmission of the data. The second probability can be weighted in the summation by a probability that the noise signal did not occur during the transmission of the data.

As an illustration, the present methods and systems can be implemented by a network device of a service provider upstream from a user device (e.g., where the noise impulse is generate). The service provider can be a network service provider, cable network provider, content provider, and/or the like. The present methods and systems can be used to interpret data signals with or without noise on a wireless network, fiber optic network, coaxial network, a combination thereof, and/or the like.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110.

The signals provided by the content sources can include a single content item or a multiplex that includes several content items.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or home communications terminal (HCT) can decode, if needed, the signals for display on a display device, such as on a television set (TV) 121 or a computer monitor. In one aspect, the user location 119 can comprise a demodulator 122 configured to receive and interpret data and/or media signals. For example, the demodulator 122 can provide a probability (e.g., likelihood ratio, log-likelihood ratio) that a portion of a received data and/or media signal represents a value, such as a bit value (e.g., 0, 1). Those skilled in the art will appreciate that the signal can be decoded and/or demodulated in a variety of equipment, including an HCT, a computer, a TV, a monitor, or satellite dish. In an exemplary aspect, the methods and systems disclosed can be located within, or performed on, one or more HCT's 120, TV's 121, central locations 101, DVR's, home theater PC's, and the like.

In an aspect, user location 119 is not fixed. By way of example, a user can receive content from the distribution system 116 on a mobile device such as a laptop computer, PDA, smartphone, GPS, vehicle entertainment system, portable media player, and the like.

In an exemplary embodiment, the methods and systems disclosed can be located within equipment located at user location 119 or other locations. For example, the methods and systems can be implemented on the demodulator 122 and/or decoder 120. As a further illustration, the methods and systems disclosed can be used to determine probability values that one or more (e.g., each) portions of a data signal represent a data bit. The probability values can be provided to the decoder 120, and the decoder can determine data values based on the probability values.

Figure 2:
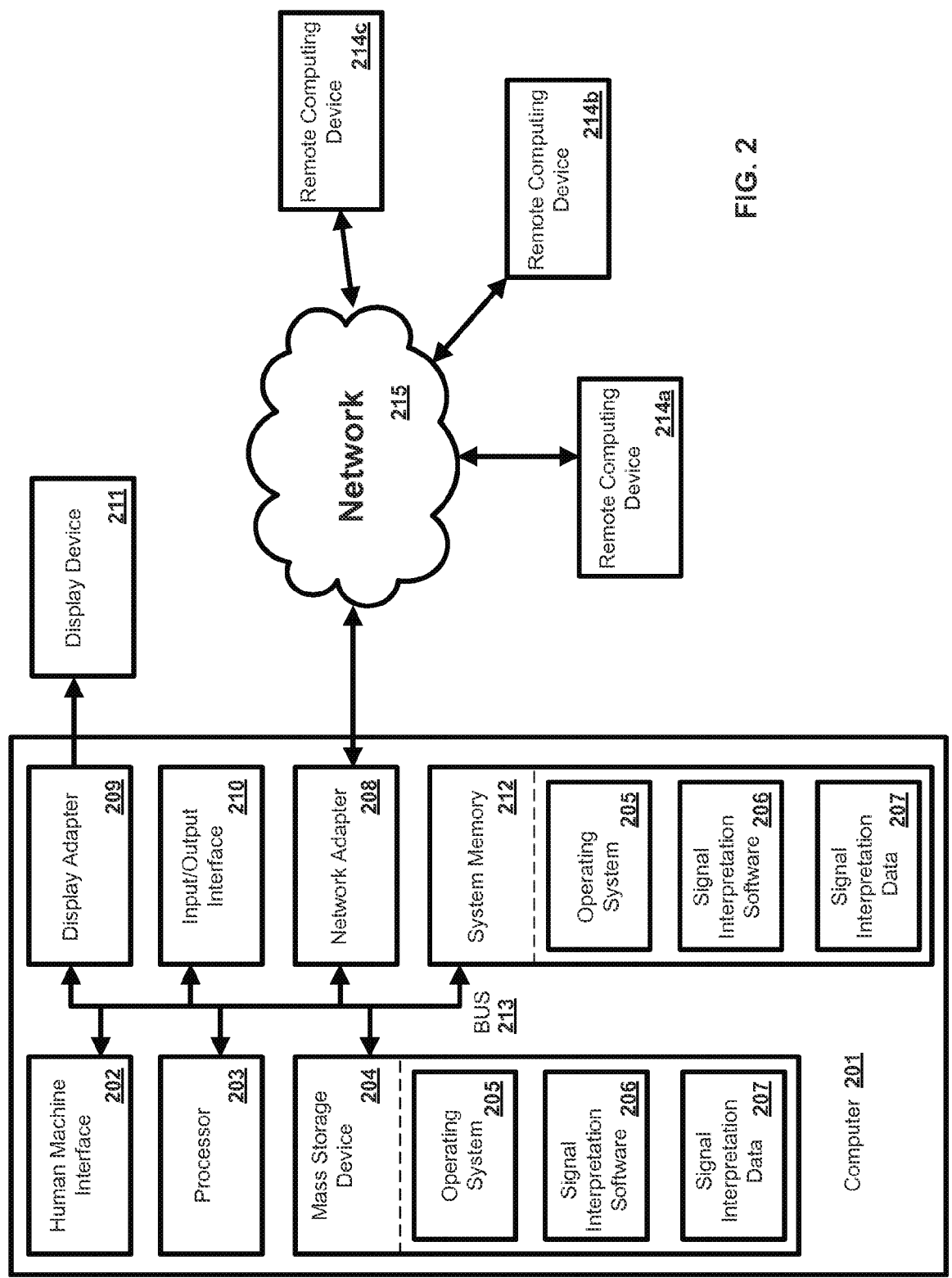
FIG. 2 is a block diagram illustrating an example computing system in which the present methods and systems can operate.

In an exemplary aspect, the methods and systems can be implemented on a computer 201 as illustrated in FIG. 2 and described below. By way of example, server 110 of FIG. 1, the first device 302 of FIG. 3, and/or the second device 312 of FIG. 3 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processor 203, a system memory 212, and a system bus 213 that couples various system components including the processor 203 to the system memory 212. In the case of multiple processors 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like.

The bus 213, and all buses specified in this description can also be implemented over a wired or wireless network connection and each of the subsystems, including the processor 203, a mass storage device 204, an operating system 205, signal interpretation software 206, signal interpretation data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as signal interpretation data 207 and/or program modules such as operating system 205 and signal interpretation software 206 that are immediately accessible to and/or are presently operated on by the processor 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and signal interpretation software 206. Each of the operating system 205 and signal interpretation software 206 (or some combination thereof) can comprise elements of the programming and the signal interpretation software 206. Signal interpretation data 207 can also be stored on the mass storage device 204. Signal interpretation data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processor 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like. The display 211 and computer 201 can be part of one device, or separate devices.

The computer 201 can operate in a networked environment using logical connections to one or more remote computing devices 214a,b,c. By way of example, a remote computing device can be a personal computer, portable computer, smartphone, a server, a router, a network computer, a peer device or other common network node, and so on. Logical connections between the computer 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the processor 203. An implementation of signal interpretation software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
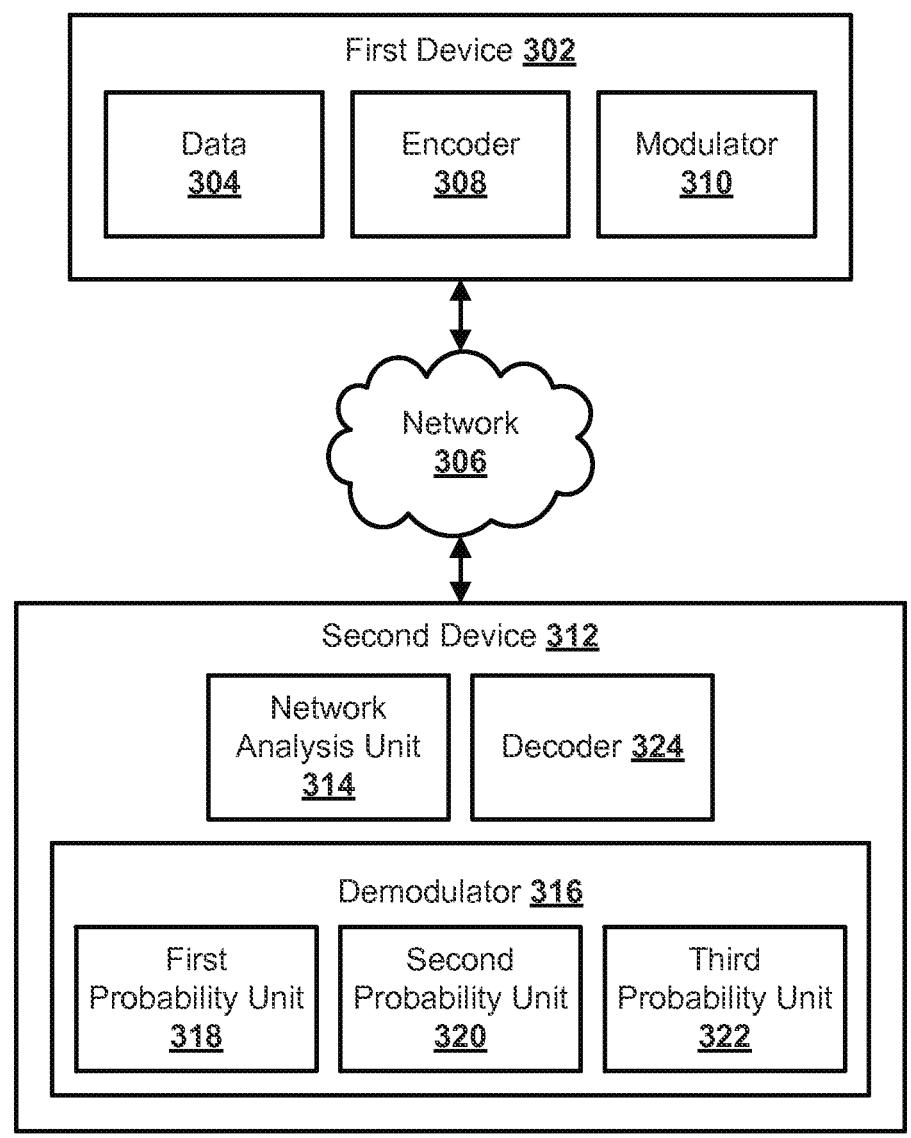
FIG. 3 is a block diagram illustrating an example system.

FIG. 3 is a block diagram illustrating an example system 300 for processing data. In one aspect, the system 300 can comprise a first device 302. The first device 302 can comprise data 304. For example, data 304 can comprise video, audio, text, metadata, and other content. The data 304 can be organized as one or more data streams, such as content channels, video on demand, digital video recordings, and the like. In one aspect, the first device 302 can be configured to provide the data 304 to other devices through a network 306. For example, the first device 300 can be configured as a data server.

In one aspect, the network 306 can comprise a packet switched network (e.g., internet protocol based network), a non-packet switched network (e.g., quadrature amplitude modulation based network), and/or the like. The network 306 can comprise network adapters, switches, routers, modems, and the like connected through wireless links (e.g., radio frequency, satellite) and/or physical links (e.g., fiber optic cable, coaxial cable, Ethernet cable, or a combination thereof). In one aspect, the network 306 can be configured to provide communication from telephone, cellular, modem, and/or other electronic devices to and throughout the system 300.

In one aspect, the first device 302 can comprise a variety of devices configured to process the data 304. For example, the first device 302 can be a converged cable access platform (CCAP) configured to provide the data 304 across a variety of networks in a variety of formats. In one aspect, the first device 302 can comprise an encoder 308 configured to encode the data 304. For example, the encoder 308 can compress, encrypt, convert, or otherwise modify the data 304. As an example, the encoder 308 can compress the data 304 to an MPEG based format.

In one aspect, the encoder 308 can be configured to employ one or more error correction techniques. For example, the encoder 308 can be configured to segment the data into a plurality of codewords. For example, the encode 308 can encode a portion of the data as a codeword. The codeword can comprise a plurality of data bits. The encoder 308 can be configured to generate one or more error check bits (e.g., parity check bits) based on the data bits. As an example, the one or more error check bits can be generated by multiplying the data bits by a codeword generation matrix. Thus data bits of the codeword can be mathematically related to the one or more error check bits. For example, the one or more error check bits can determine linear combinations of data bits that equal a specified number (e.g., zero). As a further example, the error checking bits can specify a plurality of equations configured to evaluate to a certain value when the data bits remain intact (e.g., through transmission on the network 306). In one aspect, the encoder 308 can be configured as a low-density parity check encoder, or other encoder configured to encode error check bits for a soft-decision decoder.

In one aspect, the first device 302 can comprise a modulator 310 configured to modulate the data 304 for transmission across the network 306. For example, the modulator 310 can be configured to use analog and/or digital modulation, such as amplitude modulation (e.g., quadrature amplitude modulation), phase-shift keying (e.g., quadrature phase-shift keying), and the like. The modulator 310 can be configured to convert the data 304 to one or more data signals (e.g., radio frequency data signals) for transmission across the network 306. In one aspect, the modulator 310 can be configured to provide the data 304 based on one or more multiplexing techniques, such as orthogonal frequency division multiplexing (OFDM). For example, the modulator 310 can be configured to modulate the data 304 as a plurality of data symbols at a symbol rate. A data symbol can comprise a waveform that persists for a given period of time. The symbol rate can define the number of symbols provided to a network link of the network 306 by the modulator 310 during a time period. In one aspect, the modulator 310 can be configured to modulate a data symbol as a plurality of data signals at one or more subcarrier frequencies. As an example, the modulator 310 can map one or more bit values of the codeword to a data vector. In one aspect, a data vector can be based on an in-phase value (I-value) and a quadrature value (Q-value). For example, the I-value and Q-value can define two orthogonal components of the data vector. The I-value and Q-value can be mapped or otherwise associated with the one or more bit values according to a predefined constellation diagram. The modulator 310 can generate a data signal based on the I-value and Q-value. The modulator 310 can also generate the data signal based on amplitude values according to the predefined constellation diagram. In some scenarios, the I-value and Q-value can inherently comprise amplitude values. In other scenarios, the amplitude values can be separate from the I-value and Q-value. As an illustration, the modulator 310 can generate a sinusoidal signal with a particular amplitude, I-value, and Q-value at a subcarrier frequency associated with a symbol. As a further example, the I-value can define a sinusoidal wave component that is shifted in phase (e.g., 90 degrees) from a sinusoidal wave component defined by the Q-value.

In one aspect, the system 300 can comprise a second device 312. The second device 312 can be configured to receive data 304 from the first device 302 through the network 306. The second device 312 can be configured to process the data 304 and provide the data 304 for consumption by one or more user (e.g., subscriber, customer). The second device 312 can comprise a set-top box, television, computing device, digital streaming device, gateway, and/or other device configured to receive a modulated data signal.

In one aspect, the second device 312 can comprise a network analysis unit 314. The network analysis unit 314 can be configured to measure and/or determine the occurrence of one or more noise signals. A noise signal can comprise an impulse signal, thermal noise signal, and/or the like. The impulse signal can be caused by an electronic device, electrical motor, light switch, and/or the like. For example, the impulse signal can have a short time duration (e.g., less than 5 microseconds), a different (e.g., high) amplitude in comparison to the data signal, and occur over a wide range of frequencies (e.g., from 5 to 50 MHz).

In one aspect, the network analysis unit 314 can be configured to determine a probability of occurrence of a noise signal on a network link (e.g., of the network 306) during transmission of the data 304. A probability of occurrence of a noise signal can be determined for one or more (e.g., each) of a plurality of frequencies, such as subcarrier frequencies associated with a data signal.

For example, the network analysis unit 314 can be configured to determine a probability of occurrence of one or more noise signals for one or more radio frequencies of the network link. In one aspect, the network analysis unit 314 can be configured to determine a frequency response (e.g., frequency distribution) of one or more noise signals. The frequency response can comprise a distribution of noise signal amplitudes over a range of frequencies. In one aspect, the range of frequencies can comprise subcarrier frequencies associated with transmitted data. In one aspect, the network analysis unit 314 can be configured to associate a plurality of signal-to-noise ratios with a plurality of respective subcarrier frequencies. The signal-to-noise ratios can be associated with plurality of respective subcarrier frequencies based on the frequency response of the one or more noise signals. As an illustration, when a noise signal is not present, a default signal-to-noise ratio (e.g., 30 dB, 33 dB) can be associated with all of the subcarrier frequencies. When a noise signal is present the signal-to-noise ratios associated with subcarrier frequencies can vary among the subcarrier frequencies based on the frequency response of the noise signal. For example, a noise signal can have a higher amplitude at certain frequencies (e.g., 5 MHz) and a lower amplitude at other frequencies (e.g., 42 MHz). When a noise signal is present the signal-to-noise ratio can be lower at the frequencies where the noise signal amplitude is higher. The signal-to-noise ratio can be higher at frequencies where the noise signal amplitude is lower. As an illustration, the network analysis unit 314 can associate a signal-to-noise ratio of 10 dB with a 5 MHz subcarrier frequency (e.g., where the noise signal has a high amplitude) and a signal-to-noise ratio of 33 dB with a 42 MHz subcarrier frequency (e.g., where the noise signal amplitude is low). It should be noted, however, that these numbers are merely provided for illustration, and a variety of signal-to-noise ratios can be associated with a variety of subcarrier frequencies according to the particular noise signal.

In one aspect, the network analysis unit 314 can be configured to determine the probability of occurrence of the noise signal based on a prior history of the noise signal occurrences (e.g., from one or more sources). For example, the network analysis unit 314 can be configured to determine a history of occurrence of the noise signal on a network link of the network 306 over a previous time interval. As a further illustration, the noise signal can comprise a recurring pattern of signals. For example, the noise signal can comprise a group of two or more peaks, impulses, and/or other features. Such features can be spaced by a first interval. The group can reoccur according to a second interval. As an illustration, the group of features can comprise 4 impulses that occur 400 microseconds part. The example group can reoccur every 9 milliseconds. It should be noted, however, that a noise signal can comprise a variety of features spaced at a variety of time intervals.

In one aspect, the network analysis unit 314 can be configured to determine the probability of occurrence of the noise signal based on a prediction of the occurrence of the noise signal. For example, the prediction can be based on the previous occurrence of at least a portion of the recurring pattern or other characteristic of the noise signal. For example, if a noise signal was detected at a first time, the network analysis unit 314 can be configured to predict that the noise signal will occur again at a second time. The second time can be determined based on the first interval, second interval, the first interval multiplied by a factor, the second interval multiplied by a factor, any combination thereof, and/or the like added to the first time.

In one aspect, the network analysis unit 314 can be configured to determine the probability of occurrence of the noise signal based on a detected signal. For example, the network analysis unit 314 can detect a signal and determine a probability of whether the signal comprises a noise signal. The signal can be detected during the time interval over which the data signal is transmitted. In one aspect, the signal can be detected based on a characteristic portion of the noise signal. For example, the characteristic portion of the noise signal can comprise a characteristic amplitude. The characteristic amplitude can be higher than an amplitude expected from the data signal. For example, the characteristic amplitude can be detected at a subcarrier frequency at which the data signal is nulled. As a further example, the characteristic amplitude can be detected at a time between transmission of symbols of the data signal. As another example, if a portion of the noise signal occurs during transmission of a cyclic prefix of a symbol of the data signal, then the characteristic amplitude can be detected by comparison of an expected amplitude of the cyclic prefix. In one aspect, the network analysis unit 314 can detect a noise signal based on a pattern on a constellation diagram. For example, a noise signal can be indicated if a constellation diagram shows a circle around an expected point on the constellation diagram.

The network analysis unit 314 can be configured to determine the probability of occurrence of the noise signal based on a predefined distribution. The predefined distribution can be selected based on the predefined distribution matching (e.g., within a threshold) or otherwise comprising characteristics similar to the noise signal. In some scenarios, the noise signal may not exhibit deterministic behavior, such as recurring patterns. In such scenario or otherwise, the predefined distribution can be selected as a basis for determining and/or predicting the probability of occurrence of the noise signal. In one aspect, the probability of occurrence of the noise signal can be based on the mapping of a history of a noise signal to the predefined distribution. For example, the predefined distribution can be used to predict when the noise signal will occur during a time interval. The prediction by the predefined distribution can be based on the history of the noise signal. In one aspect, the predefined distribution can be based on a parameter, such as a rate parameter and/or time parameter that is based on the history of the noise signal. As an example, mapping the history of the noise signal to the predefined distribution can comprise determining a measured or otherwise known average rate of occurrence of a noise signal (e.g., impulse noise) during a given time period (e.g., useful symbol time) and determining the predefined distribution by applying the average rate of occurrence of the noise signal to a function configured to generate the predefined distribution. As a further example, mapping the history of the noise signal to the predefined distribution can comprise determining a parameter based on the history of the noise signal and determining a probability that the noise signal will occur in a given time period by applying the parameter in the generation of a predefined distribution.

In one aspect, the predefined distribution can comprise a Poisson distribution as follows:

$$P(X = k) = e^{-\lambda} \cdot \frac{\lambda^k}{k!} \qquad \text{(Eq. 1)}$$

$$P\{X(s + t) - X(s) = k\} = (\lambda \cdot t)^k \cdot \frac{e^{-\lambda \cdot t}}{k!} \qquad \text{(Eq. 2)}$$

where P(X=k) signifies the Poisson distribution function, lambda ($\lambda$) signifies a rate parameter, t signifies a time parameter, X is a random variable representing the number of occurrences in a unit interval (e.g., a time interval), s represents a point in time, and k is a variable representing a number of impulses. In one aspect, the lambda parameter can be determined based on the number of impulses observed over a period of time on a network link. For example, the lambda parameter can be determined by dividing the number of impulses observed by the time duration of the observation. As an illustration, an example noise signal can be an impulse signal harmonically related to a 60 Hz power line alternating current (AC) rate. The example noise signal can be observed every 8 milliseconds on average. The probability that there are k impulses (e.g., for k=0, 1, 2, 3) can be determined by inserting the measured rate parameter into equation (1). In another aspect, the probability of k impulses during a given time period can be determined based on equation (2). For example, equation (2) can determine the probability of k impulses at time s over a time interval of t seconds. As an illustration, given a rate parameter, the probability that one or more impulses or other noise signals will occur during transmission of a 40 microseconds symbol (e.g., such as an OFDM symbol) can determined. It should be noted that other predefined distributions can be used instead of a Poisson distribution, such as a Gaussian distribution.

In one aspect, the second device 312 can comprise a demodulator 316. In one aspect, the demodulator 316 can be configured to demodulate data 304 that is transmitted across the network 306. The demodulator 316 can be configured to receive modulated signals representative of data bits of the data 304 and associated error check bits. In one aspect, the demodulator 316 can be configured to determine a value for each data bit according to at least a portion of a data signal received by the demodulator 316. For example, the demodulator 316 can be configured to determine an amplitude, I-value, Q-value, and/or the like of a received data signal at a subcarrier frequency. The demodulator 316 can be configured to determine a probability that the data signal (e.g., and/or corresponding amplitude, I-value, and Q-value) represents a data value. As an explanation, the data signal can be distorted by noise signals or other interference as the signal travels across the network 306. Accordingly, the data signal received by the second device 312 can be different than the original signal transmitted from the first device 302 as a result of inclusion of the noise signal or other interference to the original signal.

In one aspect, the probability that the data signal represents a data value can be a likelihood ratio. A likelihood ratio can comprise a ratio of a probability that a signal represents a first value (e.g., 1) and a probability that the signal represents a second value (e.g., 0). As a further explanation, a likelihood ratio can comprise a log-likelihood ratio. For example, a log-likelihood ratio can comprise the value of a logarithm function (e.g., natural log) applied to the likelihood ratio.

In one aspect, the probability value can be based on a function with input values, such as one or more probability values. The function can be a summation, average, division, multiplication, logarithm and/or other function. In one aspect, the probability value can be based on a summation of two or more probability values. The two or more probability values can be weighted probability values, such as weighted likelihood ratios. For example, the demodulator 316 can comprise a first probability unit 318. The first probability unit 318 can determine a first probability that a received data signal (e.g., or portion thereof) represents a bit value, such as one or zero. The first probability unit 316 can be configured to determine the first probability by summing one or more other probabilities, such as a second probability and a third probability. The second probability and the third probability can be weighted in the summation. The second probability can be weighted by the probability of occurrence of the noise signal. The third probability can be weighted by a probability of non-occurrence of the noise signal. For example, the first probability unit 318 can receive the probability of occurrence of the noise signal from the network analysis unit 318. The first probability unit 318 can also receive a probability of non-occurrence from the network analysis unit 314. In some scenarios, the first probability unit 318 and/or network analysis unit 314 can be configured to determine the probability of non-occurrence of the noise signal based on the probability of occurrence of the noise signal, and vice versa.

In one aspect, the first probability can be specific to a portion of the data signal provided at specific subcarrier frequency of the data signal. For example, a plurality of first probabilities can be determined for a plurality of portions of the data signal provided at different subcarrier frequencies.

As an illustration, the first probability can be specific to each subcarrier frequency. For example, the first probability can be determined based on assumption of a signal-to-noise ratio associated with the subcarrier frequency.

In one aspect, the demodulator 316 can comprise a second probability unit 320 configured to determine the second probability. The second probability can be a probability that the data signal represents a bit value, such as a first bit value. The second probability can be based on a presumption of occurrence of a noise signal, such as a first noise signal, during transmission of the data across at least a portion of the network 306. The second probability can be specific to a portion of the data signal provided at a specific subcarrier frequency. For example, the second probability can be determined based on a specific signal-to-noise ratio associated with the specific subcarrier frequency (e.g., based on the frequency response of the noise signal).

In one aspect, the demodulator 316 can also comprise a third probability unit 322 configured to determine the third probability. The third probability can be a probability that the data signal represents a bit value, such as the first bit value. The third probability can be based on a presumption of non-occurrence of a noise signal, such as the first noise signal, during transmission of the data across at least a portion of the network 306. The third probability can be determined based on a specified signal-to-noise ratio. For example, one or more default signal-to-noise ratios can be used to determine the third probability for a portion of the data signal provided at a specific subcarrier frequency. For example, the one or more default signal-to-noise ratios can be used to determine the third probability for some or all of the portions of the data signal provided at a specific subcarrier.

As an illustration, the first probability can be determined according to the following equation:

$$\text{Prob}\{\text{bit}=0|\vec{y}\}=\text{Prob}\{\text{bit}=0|\vec{y}\&\text{impulse}\}*\text{Prob}\{\text{impulse}\}+\text{Prob}\{\text{bit}=0|\vec{y}\&\text{no impulse}\}*(1-\text{Prob}\{\text{impulse}\}) \quad \text{(Eq. 3)}$$

The first term (e.g., left of the equal sign) can be the first probability. For example, the first probability can comprise a probability that a data vector "y" represents a bit value of zero. The second term can be the second probability multiplied by the probability of occurrence of an impulse noise signal. For example, the second probability can comprise a probability that a data vector "y," which is assumed to be modified by an impulse noise signal, represents a bit value of zero. The third term (e.g., after the + sign) can be the third probability multiplied (e.g., weighted) by a probability of non-occurrence of an impulse noise signal. For example, the third probability can comprise a probability that a data vector "y," which is assumed not to be modified by a noise signal, represents a bit value of zero.

In one aspect, the second device 312 can comprise a decoder 324. The decoder can comprise a soft-decision decoder configured to determine the values of a plurality of data bits based on probability values associated with data bits. In one aspect, the decoder 324 can comprise a low density parity check decoder. For example, the decoder 324 can be configured to receive at least one of the first probability, second probability, and third probability from the demodulator 316. As an illustration, the decoder 324 can be configured to determine the value of data bit based on the first probability. The decoder 324 can be configured to receive a respective first probability corresponding to each (or at least one) data bit value of received data.

In one aspect, the decoder 324 can be configured to determine data bit values of the received data signal based on at least one probability value (e.g., a first probability value) representative of an error check bit (e.g., parity check bit). For example, the decoder 324 can be configured to perform an iterative error checking process based on the at least one probability value. As a further example, the decoder 324 can use a message passing algorithm to iteratively converge on a determination (e.g., or approximation) of the data bit values of a transmitted codeword.

Figure 4:
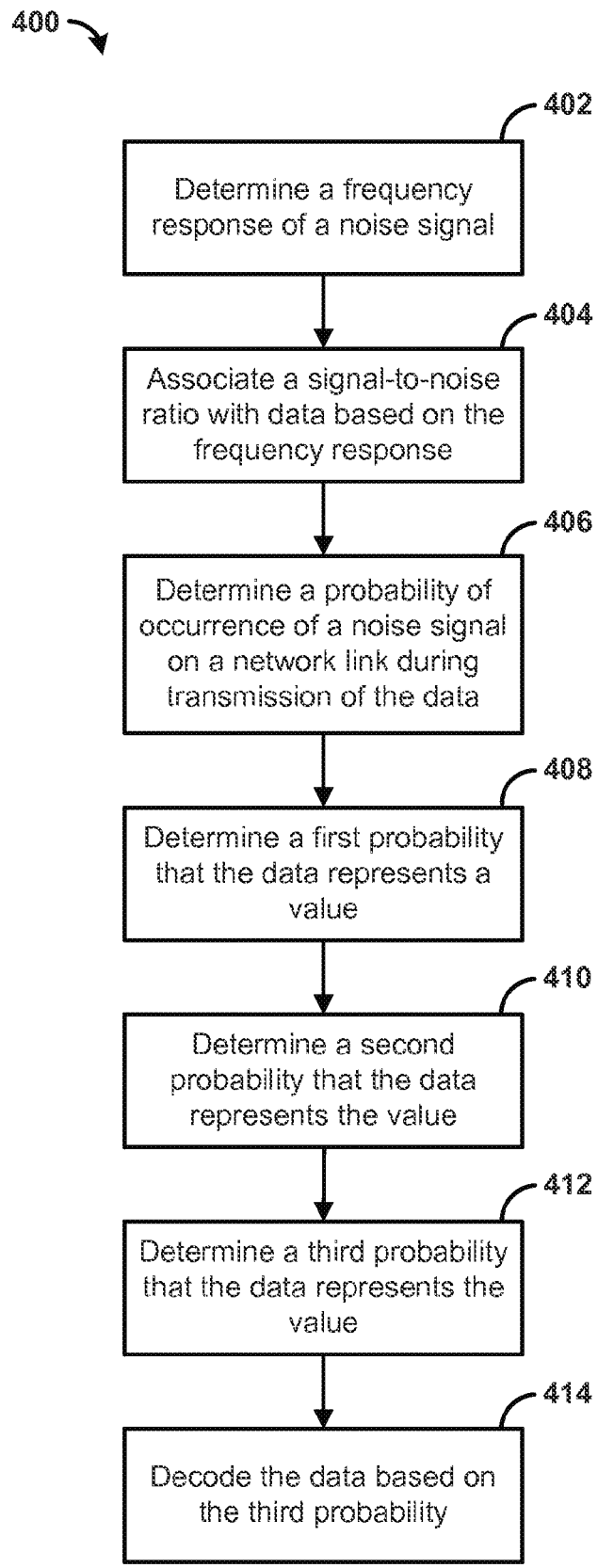
FIG. 4 is a flowchart illustrating an example method.

FIG. 4 is a flowchart illustrating an example method 400 (e.g., for processing data). At step 402, a frequency response of a noise signal can be determined. For example, the noise signal can comprise an impulse signal, thermal noise signal, and/or the like. The impulse signal can be caused by an electronic device, electrical motor, light switch, and/or the like. For example, the impulse signal can have a short time duration (e.g., less than 5 microseconds), a different (e.g., high) amplitude in comparison to the data signal, and occur over a wide range of frequencies (e.g., from 5 to 50 MHz). In one aspect, step 402 can comprise associating at least one signal-to-noise ratio with at least one frequency of the noise signal. In another aspect, step 402 can be based on a measurement of the frequency response. For example, lower signal-to-noise ratios can be associated with frequencies at which the amplitude of a noise signal has increased, and higher signal-to-noise ratios can be associated with frequencies at which the amplitude of noise signal has decreased.

At step 404, a signal-to-noise ratio can be associated with data based on the frequency response. For example, step 404 can comprise determining a frequency associated with the data (e.g., frequency at which the data was received). Step 404 can comprise selecting a signal-to-noise ratio associated with the frequency associated with the data. For example, the selected signal-to-noise ratio can be associated with the frequency based on the frequency response of the noise signal. The data can comprise data received across a network link. The data can represent a bit value of a data signal.

At step 406, a probability of occurrence of a noise signal on a network link during transmission of the data can be determined. For example, step 406 can comprise determining a history of occurrence of the noise signal on the network link over a previous time interval and mapping the history to a Poisson distribution, Gaussian distribution, and/or other distribution. Mapping the history of occurrence to the Poisson distribution can comprise determining a parameter (e.g., rate parameter, time parameter) based on the history of occurrence. Mapping the history of occurrence can comprise applying (e.g., inserting a value) the parameter to a function configured to generate the Poisson distribution based on the parameter. As another example, step 406 can comprise detecting a signal and determining a probability of whether the signal comprises the noise signal. For example, a feature of signal can be identified as characteristic of a noise signal. The feature can comprise an amplitude value (e.g., a given frequency, during the cyclic prefix), a recurring pattern, and/or the like. As yet another example, step 406 can comprise predicting the occurrence of the noise signal based on a recurring pattern of the noise signal. An example pattern can comprise a sequence of impulse signals separated by a first time interval. The sequence can be repeated after a second time interval.

At step 408, a first probability that the data represents a value can be determined. The first probability can be based on a presumption of occurrence of the noise signal during transmission of the data. The first probability can be based on the signal-to-noise ratio. For example, the first probability can be determined based on a signal-to-noise ratio associated with a portion of a noise signal. As a further example, the signal-to-noise ratio can be selected based on the frequency distribution. As another example, the signal-to-noise ratio can be selected because the signal-to-noise ratio is associated with a frequency (e.g., subcarrier frequency of a symbol of a data signal) at which the data was received. In one aspect, step 408 can comprise determining a probability that the data represents at least one of a first bit value (e.g., 0) and a second bit value (e.g., 1).

At step 410, a second probability that the data represents the value can be determined. The second probability can be based on a presumption of non-occurrence of the noise signal during transmission of the data. For example, the second probability can be determined based on a default signal-to-noise ratio. The default signal-to-noise ratio can be selected based on an assumption of non-occurrence of a noise signal.

At step 412, a third probability that the data represents the value can be determined. The third probability can be based on a function with input values, such as the first probability and second probability. The function can be a summation, average, division, multiplication, logarithm and/or other function. In one aspect, the third probability can be based on at least one of the first probability weighted by the probability of occurrence of the noise signal and the second probability weighted by a probability of non-occurrence of the noise signal. For example, step 412 can comprise summing the first probability weighted by the probability of occurrence of the noise signal and the second probability weighted by the probability of non-occurrence of the noise signal.

In one aspect, the probabilities determined herein can comprise likelihood ratios. A likelihood ratio can comprise a ratio of a probability that a value equals a first value (e.g., 1) and a probability that a value equals a second value (e.g., 0). As a further explanation, a likelihood ratio can comprise a log-likelihood ratio. For example a logarithm function can be applied to the likelihood ratio. As an illustration, the first probability can comprises a first likelihood ratio. The second probability can comprise a second likelihood ratio. The third probability can comprise a third likelihood ratio. For example, the third likelihood ratio can be the summation of first likelihood ratio weighted by the probability of occurrence of the noise signal and the second likelihood ratio weighted by the probability of non-occurrence of the noise signal.

At step 414, the data can be decoded based on the third probability. As an example, step 414 can comprise decoding the data with a soft-decision decoder, such as low-density parity-check decoder, configured to decoded data based on probability values.

Figure 5:
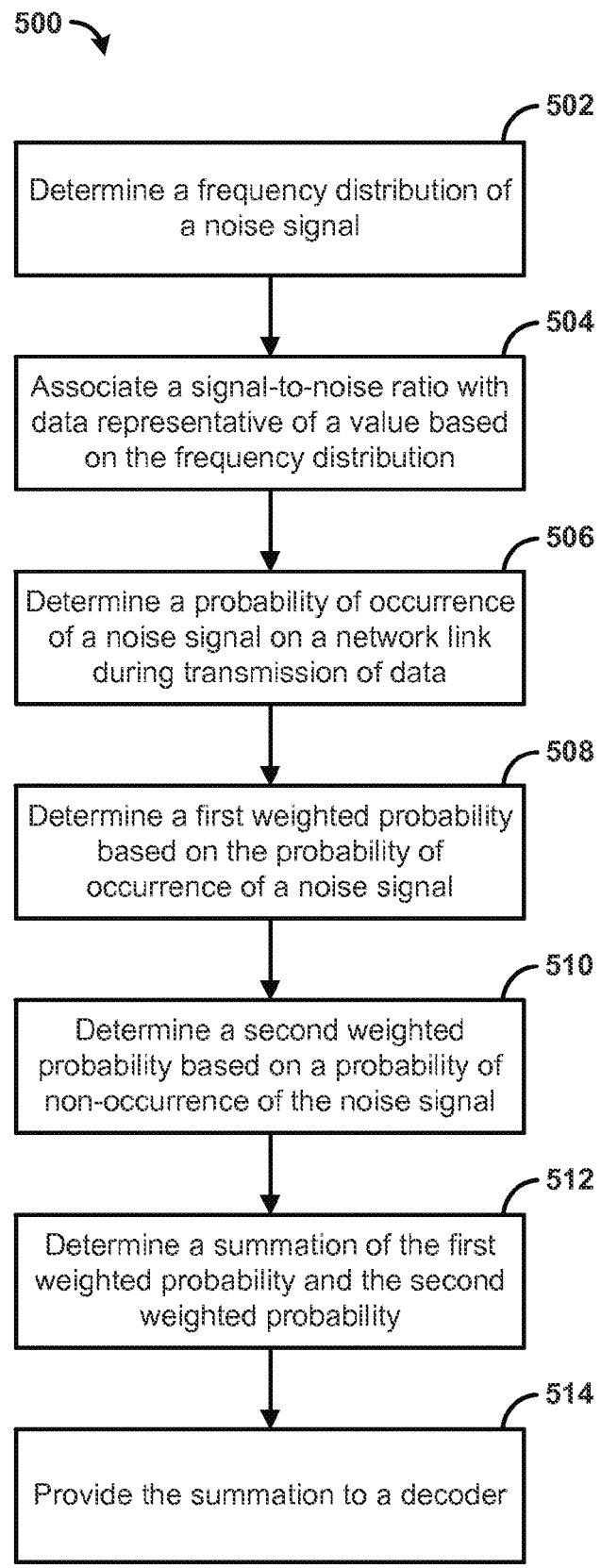
FIG. 5 is a flowchart illustrating another example method.

FIG. 5 is a flowchart illustrating another example method 500 (e.g., for processing data). At step 502, a frequency distribution of a noise signal can be determined. The noise signal can comprise an impulse signal, thermal noise signal, and/or the like. The impulse signal can be caused by an electronic device, electrical motor, light switch, and/or the like. For example, the impulse signal can have a short time duration (e.g., less than 5 microseconds), a different (e.g., high) amplitude in comparison to the data signal, and occur over a wide range of frequencies (e.g., from 5 to 50 MHz). For example, step 502 can comprise associating at least one signal-to-noise ratio with at least one frequency of the noise signal. For example, lower signal-to-noise ratios can be associated with frequencies at which the amplitude of a noise signal has increased, and higher signal-to-noise ratios can be associated with frequencies at which the amplitude of noise signal has decreased. As another example, step 502 can be based on a measurement of the noise signal across a range of frequencies.

At step 504, a signal-to-noise ratio can be associated with data representative of a value (e.g., bit value) based on the frequency distribution. For example, step 504 can comprise determining a frequency associated with the data (e.g., frequency at which the data was received). Step 504 can comprise selecting a signal-to-noise ratio associated with the frequency associated with the data. For example, the selected signal-to-noise ratio can be associated with the frequency based on the frequency response of the noise signal.

At step 506, the probability of occurrence of the noise signal can be determined. For example, step 506 can comprise determining a history of occurrence of the noise signal on the network link over a previous time interval and mapping the history to a Poisson distribution, Gaussian distribution, and/or other distribution. Mapping the history of occurrence to the Poisson distribution can comprise determining a parameter (e.g., rate parameter, time parameter) based on the history of occurrence. Mapping the history of occurrence can comprise applying (e.g., inserting a value) the parameter to a function configured to generate the Poisson distribution based on the parameter. As another example, step 506 can comprise detecting a signal and determining a probability of whether the signal comprises the noise signal. For example, a feature of signal can be identified as characteristic of a noise signal. The feature can comprise an amplitude value (e.g., a given frequency, during the cyclic prefix), a recurring pattern, and/or the like. As yet another example, step 506 can comprise predicting the occurrence of the noise signal based on a recurring pattern of the noise signal. An example pattern can comprise a sequence of impulse signals separated by a first time interval. The sequence can be repeated after a second time interval.

At step 508, a first weighted probability can be determined based on a probability of occurrence of a noise signal and based on a first likelihood ratio. As an example, the first likelihood ratio can be based on a frequency distribution of the noise signal. As another example, the first likelihood ratio can be based on the signal-to-noise ratio. A likelihood ratio can comprise a ratio of a probability that a value equals a first bit value (e.g., 1) and a probability that a value equals a second bit value (e.g., 0). As a further explanation, a likelihood ratio can comprise a log-likelihood ratio. For example a logarithm function (e.g., natural logarithm) can be applied to the first likelihood ratio. For example, the first likelihood ratio can comprise a first probability that the value is at least one of a first bit value and a second bit value. In one aspect, the first weighted probability can comprise a probability (e.g., first likelihood ratio) weighted by (e.g. multiplied by) the probability of occurrence of the noise signal.

In one aspect, the first weighted probability can be determined based on a signal-to-noise ratio associated with a portion of a noise signal. As a further example, the signal-to-noise ratio can be selected based on the frequency distribution. As another example, the signal-to-noise ratio can be selected because the signal-to-noise ratio is associated with a frequency (e.g., subcarrier frequency of a symbol of a data signal) at which the data was received.

At step 510, a second weighted probability can be determined based on a probability of non-occurrence of the noise signal and a second likelihood ratio. The second likelihood ratio can comprise a second probability that the value is at least one of the first bit value and the second bit value. In one aspect, the second weighted probability can comprise a probability (e.g., second likelihood ratio) weighted by (e.g. multiplied by) the probability of non-occurrence of the noise signal. In one aspect, the second probability can be determined based on a default signal-to-noise ratio. The default signal-to-noise ratio can be selected based on an assumption of non-occurrence of a noise signal.

At step 512, a combination (e.g., summation, product, division, exponential operation or other combination) of the first weighted probability and the second weighted probability can be determined. For example, the first weighted probability can be added to the second weighted probability.

At step 514, the combination can be provided to a decoder configured to decode a value based on the combination. For example, the decoder can comprise a low-density parity-check decoder. The decoder can comprise any other soft decision encoder. For example, a soft decision decoder can be configured to decode the data based on probability values, such as likelihood ratios. In one aspect, soft decision encoders can be configured to decode data that has been encoded with an error correcting code.

Figure 6:
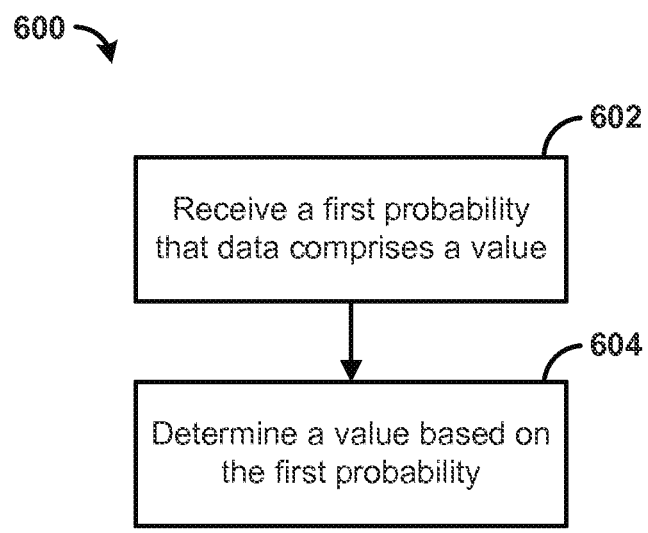
FIG. 6 is a flowchart illustrating yet another example method.

FIG. 6 is a flowchart illustrating yet another example method 600 (e.g., for processing data). At step 602, a first probability that data comprises a value (e.g., bit value) can be received. In one aspect, the first probability can be based on a weighted combination (e.g., summation, product, division, exponential operation or other combination) of a second probability and a third probability. The second probability can be a probability that the data comprises the value. For example, the second probability can be based on an assumption of occurrence of a noise signal during transmission of the data. The second probability can be weighted in the combination based on a probability of occurrence of a noise signal. The third probability can be a probability that the data comprises the value. For example, the third probability can be based on an assumption of non-occurrence of a noise signal during transmission of the data. The third probability can be weighted in the combination based on a probability of non-occurrence of the noise signal.

The noise signal can comprise an impulse signal, thermal noise signal, and/or the like. The impulse signal can be caused by an electronic device, electrical motor, light switch, and/or the like. For example, the impulse signal can have a short time duration (e.g., less than 5 microseconds), a different (e.g., high) amplitude in comparison to the data signal, and occur over a wide range of frequencies (e.g., from 5 to 50 MHz).

For example, the probability of occurrence of the noise signal can be based on a mapping of a history of occurrence to a Poisson distribution, Gaussian distribution, and/or other distribution. The history of occurrence can comprise a history of occurrence of the noise signal on the network link over a previous time interval. Mapping the history of occurrence to the Poisson distribution can comprise determining a parameter (e.g., rate parameter, time parameter) based on the history of occurrence. Mapping the history of occurrence can comprise applying (e.g., inserting a value) the parameter to a function configured to generate the Poisson distribution based on the parameter. As another example, the probability of occurrence of the noise signal can be based on a probability of whether a detected signal comprises the noise signal. For example, a feature of signal can be identified as characteristic of a noise signal. The feature can comprise an amplitude value (e.g., a given frequency, during the cyclic prefix), a recurring pattern, and/or the like. As a further example, the probability of occurrence of the noise signal can be based on a recurring pattern of the noise signal. An example pattern can comprise a sequence of impulse signals separated by a first time interval. The sequence can be repeated after a second time interval.

In another aspect, the second probability can be based on a signal-to-noise ratio associated with the data according to a frequency response of the noise signal. The frequency response of the noise signal can be based on a measurement of the frequency response.

In one aspect, step 602 can comprise determining a probability that the data represents at least one of a first value (e.g., first bit value) and a second value (e.g., second bit value). In one aspect, the probabilities determined herein can comprise likelihood ratios. A likelihood ratio can comprise a ratio of a probability that a value (e.g., bit value) equals a first value (e.g., 1) and a probability that a value equals a second value (e.g., 0). As a further explanation, a likelihood ratio can comprise a log-likelihood ratio. For example a logarithm function can applied to the likelihood ratio. For example, the first probability can comprise a first likelihood ratio. The second probability can comprise a second likelihood ratio. The third probability can comprise a third likelihood ratio. The first likelihood ratio can be based on a weighted combination (e.g., summation, product, division, exponential operation or other combination) of the second likelihood ratio and the third likelihood ratio.

In one aspect of step 602, the second probability can be received (e.g., by a decoder, such as a soft-decision encoder). The third probability can be received (e.g., by a decoder, such as a soft-decision encoder). The first probability can be determined based on the second probability and third probability. For example, a weighted combination (e.g., summation, product, division, exponential operation or other combination) of the second probability and third probability can be performed (e.g., by the decoder, such as a soft-decision encoder). As an example, step 602 can comprise summing the second probability and the third probability. The second probability can be weighted in the combination based on a probability of occurrence of a noise signal. The third probability can be weighted in the combination based on a probability of non-occurrence of the noise signal.

At step 604, the value can be determined based on the first probability. The value can also be determined based on at least one error checking bit. For example, the value can be decoded with a soft-decision decoder, such as a low-density parity-check decoder.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
    determining a probability of occurrence of a noise signal on a network link during transmission of data;
    determining a first probability that the data represents a value, wherein the first probability is based on a presumption of occurrence of the noise signal during transmission of the data;
    determining a second probability that the data represents the value, wherein the second probability is based on a presumption of non-occurrence of the noise signal during transmission of the data;
    determining a third probability that the data represents the value, wherein the third probability is based on at least one of the first probability weighted by the probability of occurrence of the noise signal and the second probability weighted by a probability of non-occurrence of the noise signal; and
    decoding the data based on the third probability.

2. The method of claim 1, wherein determining the probability of occurrence of the noise signal comprises determining a history of occurrence of the noise signal on the network link over a previous time interval and mapping the history to a Poisson distribution.

3. The method of claim 1, wherein determining the probability of occurrence of the noise signal comprises detecting a signal and determining a probability of whether the signal comprises the noise signal.

4. The method of claim 1, wherein determining the probability of occurrence of the noise signal comprises predicting the occurrence of the noise signal based on a recurring pattern of the noise signal.

5. The method of claim 1, further comprising:
    determining a frequency response of the noise signal; and
    associating a signal-to-noise ratio with the data based on the frequency response, wherein the first probability is based on the signal-to-noise ratio.

6. The method of claim 5, wherein determining the frequency response of the noise signal comprises associating at least one signal-to-noise ratio with at least one frequency of the noise signal.

7. The method of claim 1, wherein determining the third probability that the data represents the value comprises summing the first probability weighted by the probability of occurrence of the noise signal and the second probability weighted by the probability of non-occurrence of the noise signal.

8. A method, comprising:
    determining a first weighted probability based on a probability of occurrence of a noise signal and a first likelihood ratio, wherein the first likelihood ratio is based on a frequency distribution of the noise signal;
    determining a second weighted probability based on a probability of non-occurrence of the noise signal and a second likelihood ratio;
    determining a combination of the first weighted probability and the second weighted probability; and
    providing the combination to a decoder configured to decode a value based on the combination.

9. The method of claim 8, further comprising determining the probability of occurrence of the noise signal.

10. The method of claim 9, wherein determining the probability of occurrence of the noise signal comprises determining a history of occurrence of the noise signal on a network link over a previous time interval and mapping the history of occurrence to a Poisson distribution.

11. The method of claim 9, wherein determining the probability of occurrence of the noise signal comprises detecting a signal and determining a probability of whether the signal comprises the noise signal.

12. The method of claim 9, wherein determining the probability of occurrence of the noise signal comprises predicting the occurrence of the noise signal based on a recurring pattern of the noise signal.

13. The method of claim 8, further comprising:
determining the frequency distribution of the noise signal; and
associating a signal-to-noise ratio with data representative of the value based on the frequency distribution, wherein the first likelihood ratio is based on the signal-to-noise ratio.

14. The method of claim 8, wherein the decoder comprises a low-density parity-check decoder, and wherein the noise signal comprises an impulse signal.

15. A method, comprising:
receiving, at a computing device in a network, a first probability that data comprises a value,
wherein the first probability is based on a weighted combination of a second probability and a third probability, and
wherein the second probability is a probability that the data comprises the value and the second probability is weighted in the weighted combination based on a probability of occurrence of a noise signal in the network, and
wherein the third probability is a probability that the data comprises the value and the third probability is weighted in the weighted combination based on a probability of non-occurrence of the noise signal in the network; and
determining, by the computing device, the value based on the first probability.

16. The method of claim 15, wherein the probability of occurrence of the noise signal is based on a mapping of a history of occurrence to a Poisson distribution, and wherein the history of occurrence is a history of occurrence of the noise signal on the network over a previous time interval.

17. The method of claim 15, wherein the probability of occurrence of the noise signal is based on a probability of whether a detected signal comprises the noise signal.

18. The method of claim 15, wherein the probability of occurrence of the noise signal is based on a recurring pattern of the noise signal.

19. The method of claim 15, wherein the second probability is based on a signal-to-noise ratio associated with the data according to a frequency response of the noise signal, and wherein the value is determined based on at least one error checking bit.

20. The method of claim 19, wherein the frequency response of the noise signal is based on a measurement of the frequency response.

* * * * *